May 30, 1933.  R. S. M. MITCHELL  1,911,459
ARM OR LEVER OR THE LIKE
Filed Feb. 8, 1932
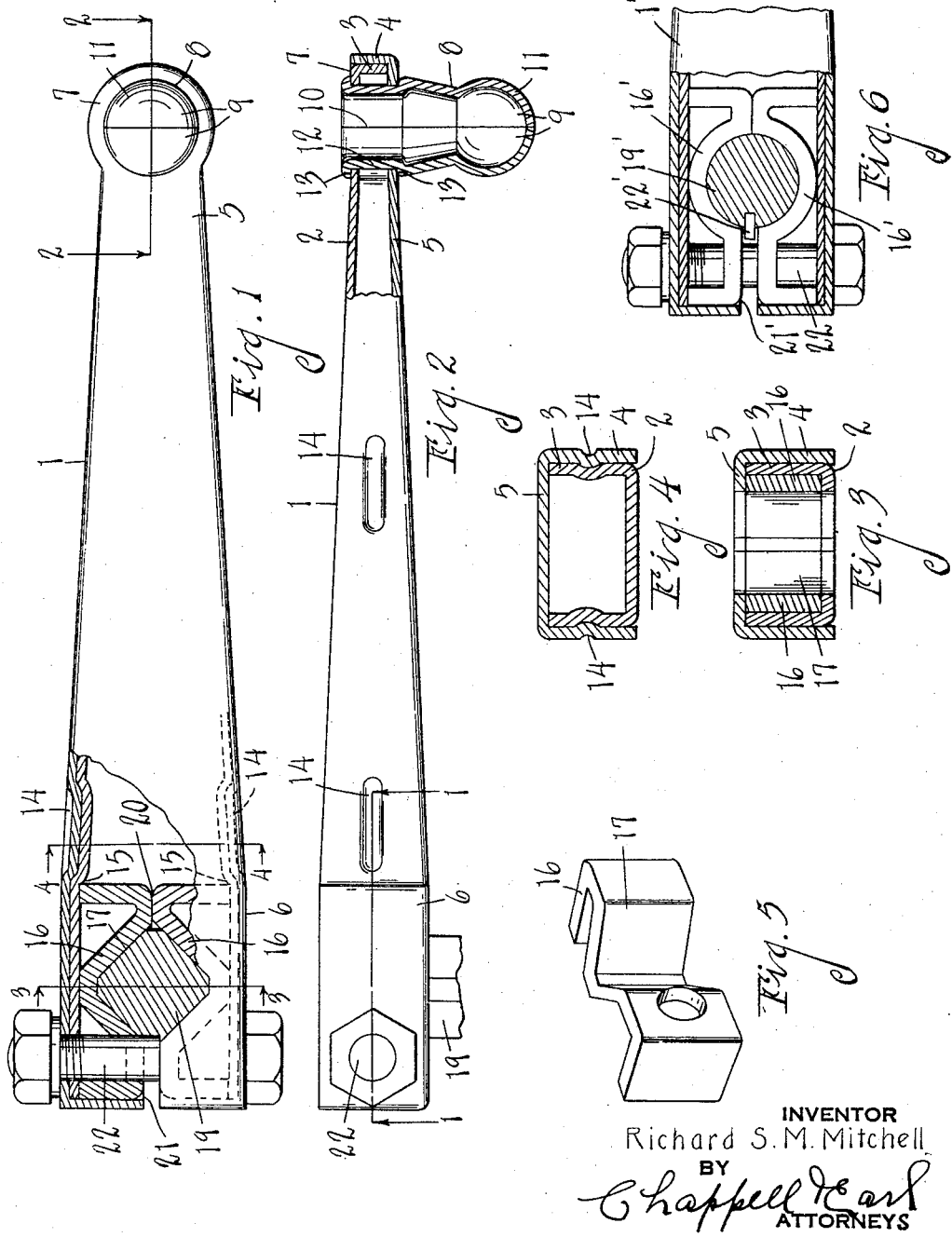
INVENTOR
Richard S. M. Mitchell
BY
Chappell Earl
ATTORNEYS Patented May 30, 1933

1,911,459

UNITED STATES PATENT OFFICE

RICHARD S. M. MITCHELL, OF DETROIT, MICHIGAN

ARM OR LEVER OR THE LIKE

Application filed February 8, 1932. Serial No. 591,735.

The main object of my invention is to provide an improved pressed metal arm or lever or the like which is simple in construction.

Objects relating to details and economies of my invention will appear from the description to follow. The invention is defined and pointed out in the claims.

A structure which is a preferred embodiment of my invention is illustrated in the accompanying drawing, in which:

Fig. 1 is a top plan view of a member embodying my invention, a portion thereof being broken away and shown in horizontal section on line 1—1 of Fig. 2.

Fig. 2 is a side elevation, parts being broken away and shown in vertical section on line 2—2 of Fig. 1.

Fig. 3 is a transverse vertical section taken on line 3—3 of Fig. 1.

Fig. 4 is a section on line 4—4 of Fig. 1.

Fig. 5 is a perspective view of a shaft boss, and

Fig. 6 is a fragmentary view similar to Fig. 1 of a modification.

Referring to the drawing, numeral 1 in general indicates an arm or lever comprising a sheet metal stamping 2 having flanges 3 telescoped within the flanges 4 of the sheet metal stamping 5. One end, which for convenience in description, will hereinafter be referred to as the inner end 6, is substantially rectangular in shape, the arm 1 tapering toward the small or outer end 7 carrying the pressed metal ball joint member 8. The ball joint member 8 comprises a pair of complemental sheet metal stampings 9 abutting edge to edge at 10 and having a ball portion 11 supported by the tubular stem 12. The tubular stem 12 is disposed in alined openings provided therefor in the webs of the arm members 2 and 5 and is provided with opposed shoulders 13 which engage said webs to interlock the members. In assembly, the tubular stem 12 is inserted in the web openings and the end of the stem is spun over the web of the channel 2 to form the shoulder 13.

The flanges 3 and 4, which overlap at the sides of the arm 1, are provided with coacting interlocking indentations 14. One set of the coacting indentations 14 is located near the inner end of the arm or lever to present internal shoulders 15 which assist in holding the coacting shaft bosses or socket members 16 in position between the arm members 2 and 5 at the inner or enlarged portion 6 thereof.

The members 16 are preferably stampings of substantial W-shape arranged in opposed relation to provide a shaft socket consisting of opposed sets 17 in the members 16.

The shaft 19 illustrated is of square cross section so that the seats are correspondingly shaped. The webs of the arm members are provided with opposed shaft openings.

The members 16 are disposed in abutting relation at 20 but at one side of the shaft, but are spaced apart at the opposite side, as at 21.

The bolt 22 is disposed through openings provided therefor in the socket member 16 and the telescoped flanges of the arm members, this bolt serving to clamp the member 16 upon the shaft and also serve to clamp the arm members upon the socket members so that these socket members become a fixed part of the arm members and distribute any stress upon the shaft to a considerable area of the arm, the socket members becoming, in effect, a reinforcing member for the arm members.

In the embodiment shown in Fig. 6, the arm is indicated generally by the numeral 1'. The socket members have curved seat portions 16' adapted to receive the circular shaft 19'. A key 22' is disposed in the slot 21' between the socket members.

My improved arm or lever member can be formed of comparatively light gauge metal and is at the same time very strong and rugged. It has the advantage of being very economical to produce and light in weight. The stampings can be very economically formed and assembled with each other and also upon the shaft or other part to which the arms or levers are connected.

My improved structure provides for a rigid joint, the movable elements of which, while being flexible in themselves, are susceptible to movement only in one plane.

This important feature allows "side sway" and "shimmying" between the chassis and the axle housing of the vehicle, but offers substantial resistance to such movements. In prior structures the sidewise flexure has been taken care of in the joint, which offers little or no resistance thereto. In my improved structure, the sidewise flexure is not obtained in the joint, which is rigid, but in the flexible members themselves, where the resistance to such flexure is considerable. Furthermore, my structure provides for a bearing, which seals the lubricant in and the dust and other foreign matter out. This is a very valuable feature, and one that is new in so far as I am aware.

I have not attempted to illustrate or describe various embodiments or adaptations which I contemplate, as it is believed that this disclosure will enable those skilled in the art to embody or adapt my improvements as may be desired.

Having thus described my invention, what I claim as new and desire to secure by Letters Patent, is:

1. In an element of the class described, the combination of a pair of opposed pressed sheet metal channels telescoped together, the webs of said channels having alined openings adjacent each end, a ball joint member having a shouldered tubular stem disposed through one set of said openings and interlocking said channels, a shaft disposed through the other set of said openings, opposed pressed metal socket members disposed within said arm and forming seats for said shaft, said arm having a slot extending outwardly from said shaft and in the plane of the longitudinal axes of said arm and shaft, and means including a bolt extending through alined openings in said arm and socket members for drawing the members on opposite sides of said slot toward each other whereby to clamp said shaft between said socket members, said flanges having coacting interlocking ribs constituting internal shoulders abutting the inner ends of said socket members.

2. In an element of the class described, the combination of a pair of opposed pressed sheet metal channels telescoped together, the webs of said channels having alined openings adjacent each end, a joint member having a shouldered stem disposed through one set of said openings and interlocking said channels, a shaft disposed through the other set of said openings, opposed socket members disposed within said arm and forming seats for said shaft, said arm having a slot extending outwardly from said shaft and in the plane of the longitudinal axes of said arm and shaft, and means extending through alined openings in said arm and socket members for drawing the members on opposite sides of said slot toward each other whereby to clamp said shaft between said socket members, said flanges having coacting interlocking ribs constituting internal shoulders abutting the inner ends of said socket members.

3. In an element of the class described, the combination of a pair of opposed pressed sheet metal channels telescoped together, the webs of said channels having alined openings adjacent each end, a joint member having a shouldered stem disposed through one set of said openings and interlocking said channels, a shaft disposed through the other set of said openings, opposed socket members disposed within said arm and forming seats for said shaft, said arm having a slot extending outwardly from said shaft, and means for drawing the members on opposite sides of said slot toward each other whereby to clamp said shaft between said socket members, said flanges having coacting interlocking ribs constituting internal shoulders abutting the inner ends of said socket members.

4. In an element of the class described, the combination of a pair of opposed pressed sheet metal channels telescoped together, the webs of said channels having alined openings adjacent each end, a joint member having a shouldered stem disposed through one set of said openings and interlocking said channels, a shaft disposed through the other set of said openings, opposed socket members disposed within said arm and forming seats for said shaft, said arm having a slot extending outwardly from said shaft, and means for drawing the members on opposite sides of said slot toward each other whereby to clamp said shaft between said socket members.

5. In a member of the class described, the combination of a pair of pressed metal channels telescoped together with their flanges in overlapping relation, pressed metal shaft socket members of W-shape disposed in one end of said member, said member having shaft openings alined with the shaft seats of said socket members, and a slot extending from said openings to the end of the member, said shaft socket members being jointed in the plane of the center of said slot and spaced apart adjacent said slot, and a bolt extending through said member, said shaft socket members and normal to said slot, for clamping said socket members on a shaft and interlocking said channels with each other and with said socket members, said slot constituting a key way.

6. In a member of the class described, the combination of a pair of channels telescoped together with their flanges in overlapping relation, shaft socket members disposed in one end of said member, said member having shaft openings alined with the shaft seats of said socket members, and a slot extending from said openings to the end of the member, said shaft socket members being spaced apart adjacent said slot, and a bolt extending through said member, said shaft socket members and normal to said slot, for clamping said socket members on a shaft and interlocking said channels with each other and with said socket members, said slot constituting a key way.

7. In a member of the class described, the combination of a pair of channels telescoped together with their flanges in overlapping relation, shaft socket members disposed in one end of said member, said member having shaft openings alined with the shaft seats of said socket members, and a slot extending from said openings to the end of the member, said shaft socket members being spaced apart adjacent said slot, and a bolt clamping said socket members on a shaft and interlocking said channels with each other and with said socket members.

8. An element of the class described comprising a pair of channel-shaped members disposed in opposed telescoping relation and having a hole through the webs thereof, and a joint member comprising a pair of stampings disposed in opposed edge to edge relation and conformed to provide a ball at their outer end and a shouldered shank disposed through said openings, the end of said shank being upset whereby the joint member is secured in position and constitutes a securing member for said arm members.

9. An element of the class described comprising a pair of channel-shaped members disposed in opposed telescoping relation and having a hole through the webs thereof, and a joint member comprising a pair of stampings disposed in opposed edge to edge relation and conformed to provide a shouldered shank disposed through said openings, the end of said shank being upset whereby the joint member is secured in position and constitutes a securing member for said arm members.

10. In a member of the class described, the combination of a pair of channels telescoped together with their flanges in overlapping relation, socket members disposed in one end of said member, said member having openings alined with the seats of said socket members, and a slot extending from said openings to the end of the member, said socket members being spaced apart adjacent said slot, and means clamping said socket members on a shaft and interlocking said channels with each other and with said socket members.

In witness whereof I have hereunto set my hand.

RICHARD S. M. MITCHELL.